Figure 1A:
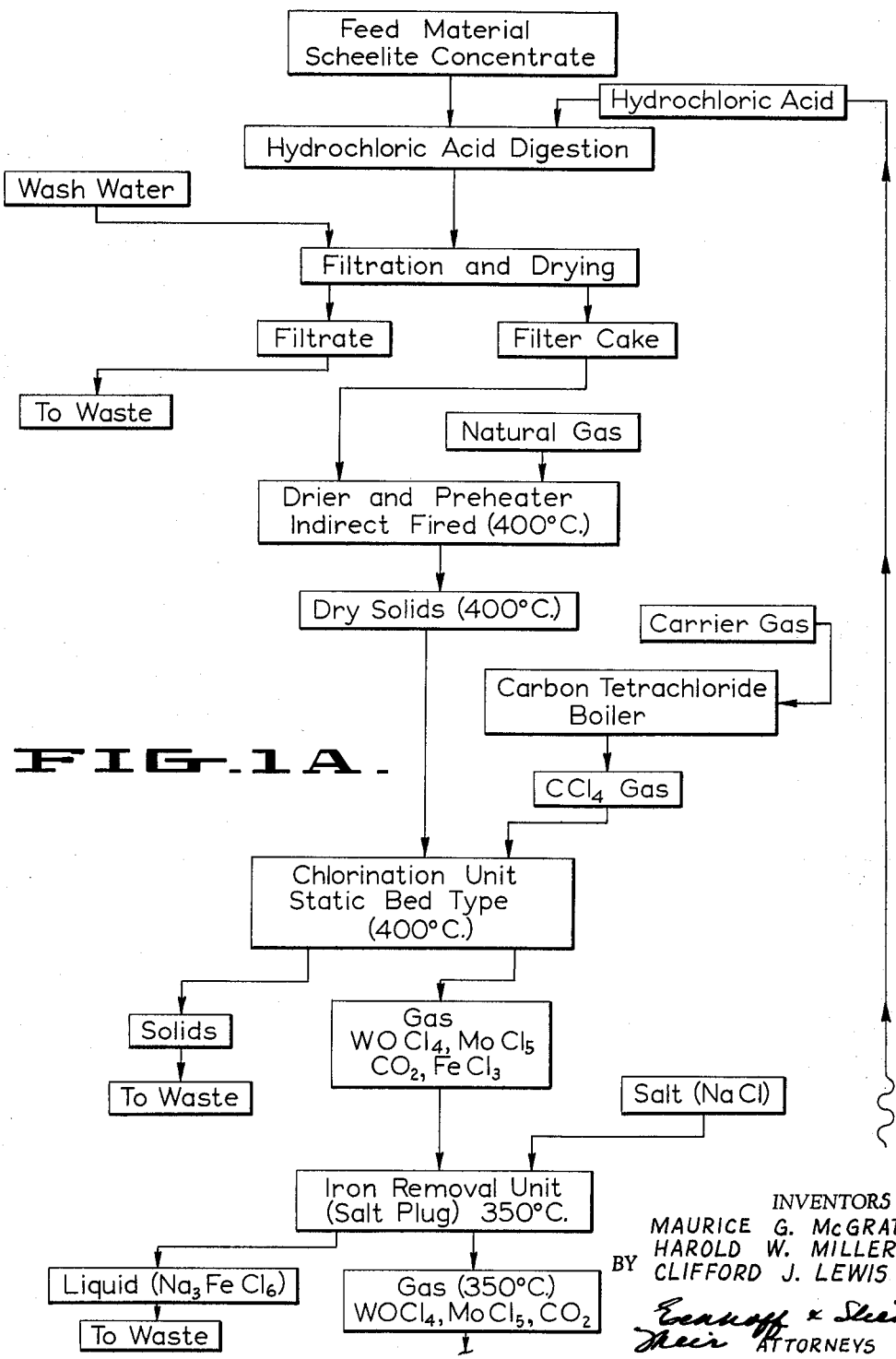

June 7, 1966  M. G. McGRATH ET AL  3,254,945
PROCESS FOR PRODUCING A NOVEL FORM OF TUNGSTIC OXIDE
Filed July 10, 1962  3 Sheets-Sheet 1

INVENTORS
MAURICE G. McGRATH
HAROLD W. MILLER
CLIFFORD J. LEWIS
BY
ATTORNEYS

3,254,945
PROCESS FOR PRODUCING A NOVEL FORM OF TUNGSTIC OXIDE
Maurice G. McGrath, 511 S. Newland St., Denver, Colo.; Harold W. Miller, 250 Pearl St., Boulder, Colo.; and Clifford J. Lewis, 2205 Carr St., Lakewood, Colo.
Filed July 10, 1962, Ser. No. 208,877
5 Claims. (Cl. 23—17)

This invention relates to a process for the manufacture of tungsten oxide, particularly one which is characterized by either an extremely low molybdenum content or a total absence of molybdenum. The invention also relates to production of a novel form of tungstic oxide having increased utility as compared with tungstic oxide as produced heretofore.

With the exception of tungsten employed as a charge to class A steel, nearly every other use requires a product low in molybdenum. For example, producers of filament wire call for a maximum molybdenum content of 0.025 to 0.002%, and in general a molybdenum content of 0.10% or less is desirable.

Tungsten ores of the scheelite and scheelite-powellite type usually contain some of the molybdenum as lime compounds such as calcium molybdate, $CaMoO_4$, which cannot be separated by physical or physiochemical milling methods since it is in an isomorphic mixture with the scheelite, $CaWO_4$. Chemical dissolution methods are generally used to recover the tungsten and molybdenum constituents of these ores or their concentrates, followed by separation of the precipitated crude tungsten oxide containing various impurities including molybdenum compounds. Usually the crude tungsten oxide is redissolved in alkali and reprecipitated to free it from impurities, and two or more such treatments may be required. Finally, the oxide usually is treated with ammonia to form the paratungstate which is filtered, dried and ignited to obtain a relatively pure tungsten oxide.

It has been suggested in U.S. Patent 2,801,152 to dissolve the tungsten and molybdenum compounds of minerals and the like in strong hydrochloric acid at a temperature below about 70° C. at which all the molybdenum and tungsten will remain in solution. The solution is then filtered to separate acid-insoluble impurities, heated to precipitate yellow tungsten oxide and again filtered to separate the tungsten oxide from the molybdenum compounds remaining in solution.

Veller, U.S.S.R., 111,097 [C.A. 52, 18162 (1958)] shows solution of tungsten-molybdenum concentrates in hydrochloric acid followed by dilution with water to precipitate the tungsten and leave molybdenum in solution. Zelikman, U.S.S.R., 113,145 [C.A. 53, 2554 (1959)] describes separation of tungsten from molybdenum oxide by heating with sodium chloride at 500–600° to form $MoO_2Cl_2$ which is driven off at a temperature below that at which tungsten oxide volatilizes.

An analytical technique has been described (Scott's Standard Methods of Chemical Analysis, 5th Edition, vol. 1, D. Van Nostrand, N.W. 1939, p. 1004) in which molybdenum oxide heated in a current of dry hydrogen chloride gas at 250–270° C. forms $MoO_3 \cdot 2HCl$ which sublimes, while tungsten is not affected. This procedure is useful when the tungsten and molybdenum minerals or compound are present as separate entities and do not exist in isomorphous combination.

It will be apparent that these various purification processes are costly and time-consuming. In contrast, the present invention is simple, efficient and economical and it provides a substantial economic advantage over other recovery and purification processes.

As has been pointed out in the Rare Metals Handbook, Second Edition, Reinhold, 1961, pages 580–598, it is noteworthy that the physical properties possessed by finished tungsten products are materially affected by the chemical and physical characteristics of the power from which they are produced. These, in turn, are dependent on the chemical and physical properties of the oxide from which the metal is reduced, and the conditions of reduction. Obviously, then, control of the properties of the final product begins almost with the inception of ore decomposition, and controlled variations are necessary throughout the process to yield the desired properties in the finished product. As will be brought out subsequently, the present invention is thus particularly advantageous in contributing highly desirable properties to tungsten oxide and to products which may be obtained therefrom such as ductile tungsten metal, tungsten containing alloys and compounds of tungsten such as tungsten carbide in cemented form. The tungstic oxide produced by the process of this invention is characterized by its fine and uniform state of division. Essentially, the final oxide product is of a uniform size of about 1.5 microns, plus or minus 0.5 micron. This fineness enables the oxide to be reduced readily to tungsten metal which in turn is in a fine and uniform state of division.

Figure 1B:
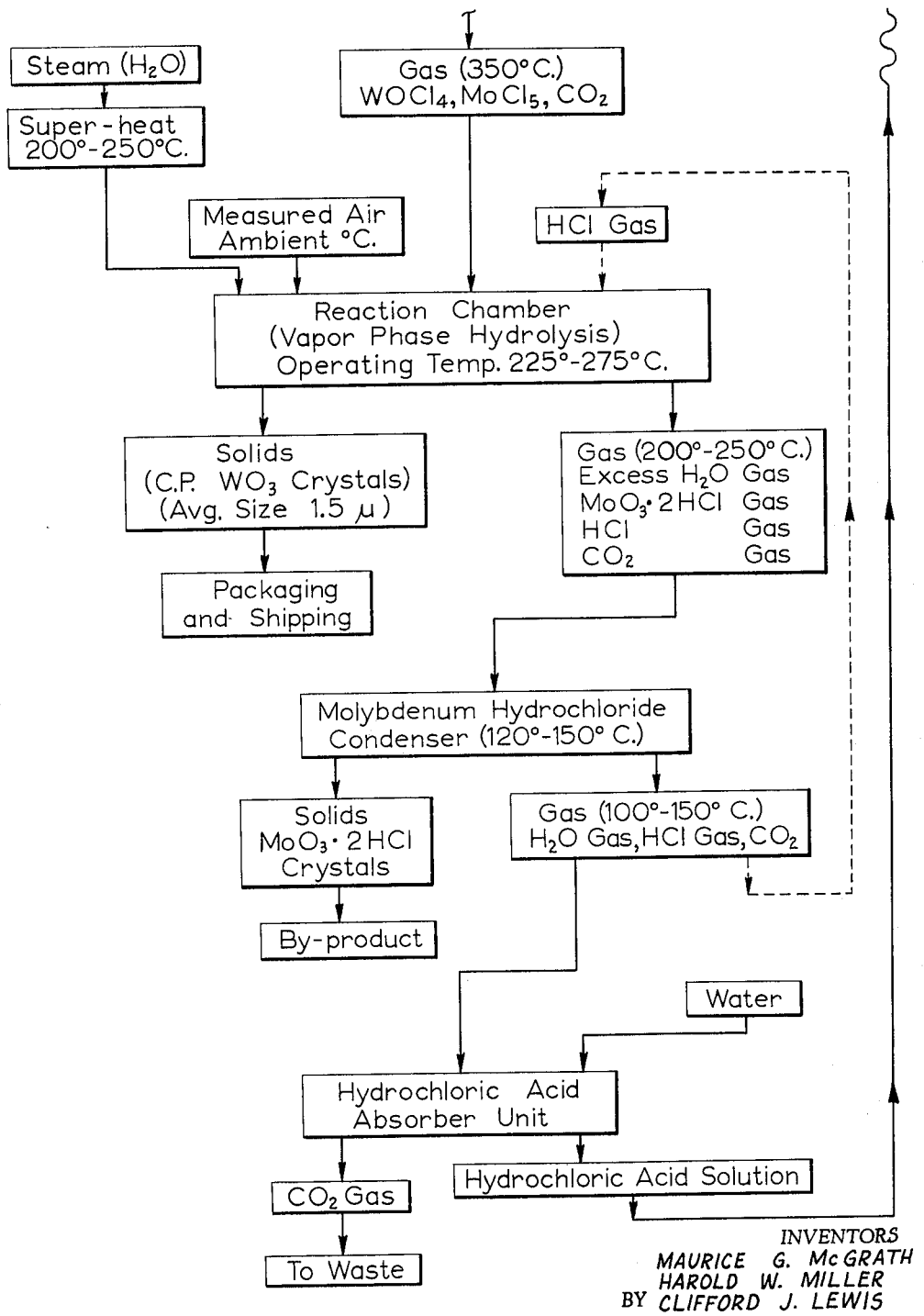

In the drawing accompanying and forming a part hereof FIGURES 1A and 1B when taken together provide a diagrammatic showing of a process flow sheet which can be employed to practice the present invention.

Figure 2:
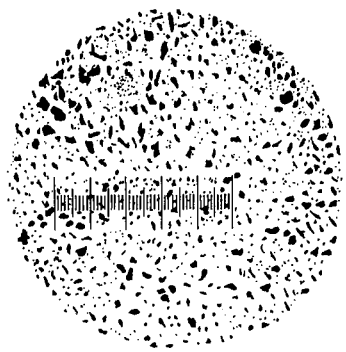

FIGURE 2 is a drawing of a photomicrograph taken under a magnification of 400 diameters of the product of a run in which all of the tungstic oxide particles have the dimension of 1.5 plus or minus 0.5 micron.

The accompanying flow sheet as diagrammed in FIGURES 1A and 1B provides an outline of the presently preferred process as it has been applied successfully. The feed in this operation was a filter cake from the digestion of a scheelite ore with hydrochloric acid to convert the scheelite to $WO_3$ and soluble calcium chloride. The wet filter cake was dried by indirect heating in a gas fired furnace. The filter cake solids consisted of a finely divided crude tungsten oxide containing the gangue minerals, molybdenum sulfides and oxide and iron sulfide minerals. This crude material was then subjected to a reduction-chlorination, preferably by contact with carbon tetrachloride vapor at a reaction zone temperature of 400° C. At this temperature, one can employ stainless steel as the material of construction for the reduction-chlorination system equipment. As is explained herein, the reduction-chlorination can be effected with carbon and chlorine but this usually requires a temperature substantially elevated above 400° C., usually about 650° C. to 1200° C. What is desired is to produce a gas phase containing tungsten oxychloride, molybdenum pentachloride and hydrogen chloride from which these three components can be separated and recovered respectively as tungsten oxide, molybdenum oxide-hydrochloride and hydrochloric acid.

The acid prepared solids are free-flowing and, due to the absence of calcium salts, remain so during the reduction-chlorination, thus permitting the use of a static bed reactor. The chlorination reaction proceeds very rapidly with the formation of a gas phase containing tungsten oxychloride, molybdenum pentachloride, carbon dioxide and some ferric chloride. The gangue minerals, molybdenum sulfide and the iron sulfide remain as inert materials and are discharged to waste.

The gas phase is treated to remove ferric chloride by passage through a porous mass of sodium chloride to form a non-volatile sodium chloride-ferric chloride compound which is removed as a liquid. (See Krchma Patent 2,533,021, December 5, 1950.) The next step is that of reacting the iron-free gas phase with superheated steam to hydrolyze the tungsten oxychloride to tungsten trioxide, a crystalline solid, and release hydrogen chloride.

We have found that if the hydrolysis reaction is conducted at a temperature in the range of 225–275° C., the molybdenum oxide reacts with the hydrogen chloride present to form a volatile molybdenum oxide-hydrogen chloride compound. The optimum temperature is about 250° C. for above 275° C. tungsten is lost in the form of $WOCl_4$. The quality of the product may be improved by adding hydrogen chloride so that it is present in excess of that released by the hydrolysis. The concentration of the hydrogen chloride should be such that the molybdenum oxide-hydrogen chloride compound is formed. To this end it may be necessary to introduce hydrogen chloride from an external source or to recycle some of that produced in the process as we have indicated by the dotted line in the flow sheet.

The tungstic oxide produced is microcrystalline and is of a substantially uniform size, about 1.5 microns in diameter. The photomicrograph of FIGURE 2 illustrates the size of the type of particle which can be produced. The true particle size is represented by the smallest dot visible in the photomicrograph. The larger dots consist of clusters of the smaller particles which are easily separated into the individual particles.

The gas phase leaving the reaction chamber comprises steam, carbon dioxide, hydrogen chloride and the molybdenum oxide-hydrogen chloride compound. The gas phase is then passed through a condenser maintained at a temperature below about 150° C. to condense the molybdenum oxide-hydrogen chloride as a solid which is removed. The remaining gas phase contains steam, hydrogen chloride and carbon dioxide. This is treated for the recovery of the hydrogen chloride which can be recycled to the reaction chamber for admixture with the steam or employed in the digestion step.

In the case of a tungsten oxide containing ore such as scheelite wherein the ore is digested with hydrochloric acid, the hydrogen chloride produced from the hydrolysis of the tungsten oxychloride is of substantial economic significance for the hydrogen chloride can be recovered as hydrochloric acid and utilized in the digestion step.

In accordance with the process of the present invention, tungsten oxide of high purity and essentially free of molybdenum is obtained from the chlorination products of tungsten containing ores, minerals and concentrates such as scheelite, $CaWO_4$; powellite, $CaMoO_4$; cuprotungstite, $CuWO_4$; ferberite, $FeWO_4$; wolframite $(Fe,Mn)WO_4$; huebnerite, $MnWO_4$ and the like. The tungsten containing ore to be processed is suitably conditioned so that it is of a desired tungsten content and of a size rendering it amenable to chlorination.

It will be understood that many modifications may be made in the technique of carrying out the process. For example, while it is preferred to use a concentrate containing 60% or more of tungsten oxide, the invention is equally applicable to ores and concentrates of lower tungsten content, and to materials which may be unmarketable at present because of too high a molybdenum content or because of the presence of other metal impurities such as iron, copper, tin, lead, etc.

The treatment of the ore or concentrate material prior to chlorination will depend upon the specific ore in question and the impurities present. In some cases, it will be desirable to chlorinate the tungsten-bearing material directly, without any preliminary treatment, while in other cases some preliminary chemical or physical beneficiation, or both, may be desirable or necessary. Thus, some tungsten ores and concentrates and waste tungsten residues are rendered more economically amenable to the chlorination step if such tungsten-containing materials are first treated with a mineral acid and dried prior to chlorination.

As a specific example of pretreatment, one type of scheelite concentrate was found to be resistant to low temperature chlorination which is particularly desirable if stainless steel equipment is to be used. The concentrate was given a treatment with 38% hydrochloric acid at 85° C. to convert all of the scheelite to tungsten oxide. Following the leaching step, the acid was separated from the residue, a step of particular value if the concentrate contains iron values since the major portion of the iron is solubilized by the acid leach. In the absence of the preliminary acid leach step, it was found necessary to employ a much higher temperature for the chlorination of this particular scheelite concentrate, a temperature of the order of 600° C.

A wide range of chlorination techniques may be used, depending upon the type of material being treated, the impurities present, and the like. The type of reactor used will be dictated by economics and by the specific ore or concentrate under consideration. Thus vertical and horizontal tube reactors, static and fluid beds and rotary tube reactors all may be used with equal success insofar as the chemistry of the invention is concerned.

The temperature at which chlorination is carried out will be dictated by the limitations of the materials of construction of the reactor, the particular ore or concentrate being treated, the type of pretreatment and the chlorinating agent used. The lower limit on the temperature of the chlorination operation is that at which tungsten oxytetrachloride forms and volatilizes, i.e., in the neighborhood of its boiling point of 227° C. The upper temperature limit will be determined by the ability of the materials of construction to withstand the chlorinating agents and products and may be as high as 600–1200° C. when carbon and chlorine are used. It is preferred, however, to carry out the chlorination step within the temperature range of 300–600° C. by using carbon tetrachloride or an equivalent material.

While it is preferred to use carbon tetrachloride as the reducing-chlorinating agent, one can use any other chlorinated hydrocarbon which is free of hydrogen. For example, one can use perchlorethylene, hexachlorethane and like totally chlorinated compounds. One can use an oxygen-containing chlorine carbon compound such as phosgene for this essentially is carbon monoxide and chlorine. These reducing-chlorinating agents enable one to employ a material at lower temperatures, e.g. 300–600° C., as compared with the higher temperatures required by carbon and chlorine, e.g. 600–1200° C.

Contact of the chlorinating reagent and the ore or concentrate may be facilitated by use of a carrier gas. This is particularly advantageous when a fluidized bed type reactor is used. Air is the preferred carrier gas, although in some cases argon, helium, nitrogen, carbon dioxide, carbon monoxide, etc., may be used as diluent or carrier gases. Hydrogen or hydrogen-containing gases should be avoided so as to prevent premature hydrolysis of chlorides in the reactor by water formed from the hydrogen. The quantity of carrier gas required is relatively small; the quantity of carbon tetrachloride in one carbon tetrachloride-air mixture we employed was in excess of 95 mol percent.

The volatile reaction products from the chlorination step are led directly into a hydrolysis-condenser chamber, in which they are brought into intimate contact with water vapor, or preferably with a mixture of water vapor and hydrogen chloride. Intimate mixing of the two vapor streams may be achieved by any suitable means, as for example, by a fan or propeller in the mixing chamber, by use of tangentially opposed jets or by use of orifice type mixers.

Insofar as the tungsten and molybdenum components of the volatile chlorination product are concerned, it is postulated that the following reactions may take place:

$$WOCl_4 + 2H_2O \rightarrow WO_3 + 4HCl$$
$$MoCl_5 + H_2O \rightarrow MoO_3 \cdot 2HCl$$

(equation not balanced)

By maintaining the temperature of the first portion of the condenser at approximately 200–300° C., the tungsten oxide is precipitated as a solid, while the molybdenum oxide-hydrogen chloride compound is volatile and continues in the vapor stream. The temperature in this part of the condenser is not permitted to rise above about 300° C., since above this temperature tungsten dioxydichloride, $WO_2Cl_2$, is formed and is volatile in the 300–400° C. range. In the second portion of the condenser, the temperature is allowed to fall below 150° C., for example, to about 100° C., to condense the molybdenum material. The non-condensable portions containing hydrogen chloride and gaseous decomposition products are vented or taken into a collection chamber for recovery of the hydrochloric acid values.

The following examples are specific illustrations of the practice of this invention.

*Example 1*

A scheelite concentrate containing 70% tungsten oxide, 6.4% ferrous oxide and 1.2% molybdenum oxide (molybdenum present as powellite and molybdenite) and the balance, calcium oxide, was ground to 90% —48 mesh. Twenty-five grams of the ground concentrate were then agitated for an hour with 50 grams of 38% hydrochloric acid at 75° C. The temperature was then increased and the mixture taken to dryness. This treatment converted the scheelite to tungsten oxide and calcium chloride. After grinding to —65 mesh the material was placed in a vertical reactor and heated to 400° C. Carbon tetrachloride vapor was passed upward through the material at 400° C. to form a gas stream of volatile chlorides. This was passed into a condenser-hydrolysis chamber maintained at 210° C. where the stream was brought into contact with a stream of hydrogen chloride-water vapor.

The hydrogen chloride-water vapor mixture was prepared by bubbling air through a solution of 38% hydrochloric acid maintained at approximately 20° C. This gas mixture was then preheated to approximately 100° C. before mixture with the volatile chlorides. A precipitate of tungsten oxide was formed in the portion of the condenser maintained at 210° C., while the molybdenum was thereafter precipitated in another portion of the condenser maintained at 100° C.

A sample of the tungsten oxide was examined in a fluorescent X-ray spectrograph sensitive to 0.006% $MoO_3$. It was not possible to detect any molybdenum in the sample; the only impurity found was $MnO_2$ which assayed at 0.05%. The yield of pure tungsten oxide was essentially quantitative.

*Example 2*

The run of Example 1 was repeated, but a glass wool filter was placed in the cool exit end of the condenser-hydrolysis chamber. A sample of material was collected in the heated portion as before, and another collected on the glass wool filter. By means of a very sensitive spot test using potassium ethyl xanthate, it was found that no molybdenum was present in the sample from the heated portion of the condenser, while molybdenum was present on the glass wool filter.

*Example 3*

Twenty-five grams of the scheelite concentrate of Example 1 were heated and agitated with 50 grams of 38% hydrochloric acid for 1½ hours at 75° C. The excess acid and water were decanted. The residue was washed for 15 minutes with a quantity of hot water equivalent to the amount of acid originally used, then decanted, filtered and dried. The material, now containing 90% tungsten oxide and only 0.54% ferrous oxide (91.6% iron removal) was used as the feed for chlorination as described in Example 1. Again an extremely pure tungsten oxide product containing no detectable molybdenum was secured.

*Example 4*

In another embodiment of the invention, a tungsten concentrate containing approximately 70% of tungsten oxide was comminuted so that 90% passed a 65 mesh screen. This particle size offers sufficient surface area so that the chlorination reaction can proceed at a satisfactory rate. The comminuted material was dried so that no free water is present. The dried material was charged to a vertical shaft reactor, heated to approximately 400° C. Carbon tetrachloride vapor was passed up through the bed of material to achieve formation of volatile tungsten oxychloride, $WOCl_4$, molybdenum pentachloride, $MoCl_5$, and other chlorides volatile at this temperature. The exit gas stream from the furnace containing these volatile chlorides, together with excess carbon tetrachloride vapors and decomposition products such as phosgene, etc., was passed through a bed of sodium chloride and then into contact with a stream of hydrogen chloride-water vapor at a temperature of 150–300° C., in such manner as to obtain rapid and efficient mixing of the vapor streams. Under these conditions the tungsten materials were essentially quantitatively converted to very pure tungsten oxide which precipitated. The molybdenum content remained in the vapor stream, probably as $MoO_3 \cdot 2HCl$. The vapor stream carrying the volatile molybdenum compounds was then cooled to below 150° C. to condense the molybdenum material, while the hydrogen chloride vapor was vented.

The condensed tungstic oxide product is shown in photomicrograph of FIGURE 2. Attention is called to the remarkable uniformity in product size, all the particles of tungsten oxide having a dimension of 1.5 plus or minus 0.5 micron; the space between the smallest lines in the original was 3.7 microns. The true particle size is represented by the smallest dot visible. Larger dots consist of clusters of the small particles which readily break up under light attrition. The fact that the tungstic oxide particles are small and uniform in size makes the product of great value in the production of ductile tungsten metal where the small uniform particle size is a prerequisite for the starting material.

*Example 5*

A mixture of equal weights of flotation concentrate (32% $WO_3$) and pulverized quartz was roasted with 10 grams $H_2SO_4$ per 100 grams of mixed solids. The roasting was conducted over a burner, with a solids temperature of about 350° C., and was continued until the evolution of fumes of $SO_3$ had apparently ceased. The roasted material, containing 15.1% $WO_3$, was mixed with 100 grams fluid petroleum coke per 135 grams of roasted material. The mixture was placed in a vertical reactor, heated to 650° in a stream of nitrogen and 6½ liters of chlorine were added at about 100 ml./min. The exit gas stream was cooled as in Example 1 to produce the finely divided tungstic oxide product of this invention.

*Example 6*

In an operation on a larger scale and carrying out the flow sheet of FIGURES 1A and 1B, a ground scheelite-powellite ore was acid leached on a batch basis. The ore contained 3465 lbs. of scheelite, 119 lbs. of powellite, 364 lbs. of iron oxide and 1632 lbs. of an insoluble gangue. The leaching was carried out with 8750 lbs. of a 23.4% solution of hydrochloric acid. The resulting slurry was filtered and the filter cake passed through a dryer maintained at about 400° C. The filter cake amounted to 9552 lb. and contained 32% of moisture.

The dried solids were fed at the rate of 375 lbs. per hour into a chlorinator maintained at 400° C. The dried solids contained 62% $WO_3$, 1.9% $MoO_3$ and the balance being insolubles. Carbon tetrachloride vapor was fed into the chlorinator at the rate of 174 lbs. per hour at 78% C. Air was bubbled through the carbon tetrachloride to act as a carrier, the air-carbon tetrachloride proportion being such that from 0.1 to 0.5 mol percent of air was employed.

The gas stream issuing from the chlorinator amounted to 400 lbs. per hour and contained 85.5% of $WOCl_4$, 11% $CO_2$ and 3.5% $MoCl_5$. This gas stream was passed through a salt plug maintained at 375° C. to remove any trace of iron which was present. The resulting iron-free gas was then passed into a reactor maintained at about 250° C.; the gas stream contained, on a per hour basis, 342 lbs. of $WOCl_4$, 44 lbs. of $CO_2$, 14 lbs of $MoCl_5$ and 2.5 lbs. of air added at the chlorinator. Steam was also introduced into the reactor at the rate of 72 lbs. an hour and a temperature of 105° C. As a solid product from the reactor, 232 lbs. an hour of tungstic oxide were removed as a finely divided material, all of a size less than 2 microns. The gas stream, amounting to 261.275 lbs., was cooled in a condenser to a temperature of 135° C. to precipitate solid molybdenum oxide-hydrochloride, $MoO_3 \cdot 2CHl$.

The gas stream issuing from the condenser, after circulating sufficient of the gas stream to supply 12.4 lbs. of hydrogen chloride to the reactor, amounted to 221.3 lbs. per hour. Initially the reactor was operated without any hydrogen chloride. Once the operation was underway a small quantity of hydrogen chloride was added to the feed to improve the quality of the product.

The remaining gas stream contained 151.6 lbs. HCl, 44 lbs. carbon dioxide and 33.7 lbs. of water. It was mixed with water in an absorber to provide 728 lbs. per hour of a 23.4% solution of hydrochloric acid. This was accumulated and was fed into the digester to treat a further batch of incoming ore.

We claim:

1. A process for recovering tungsten oxide from an ore containing tungsten oxide and molybdenum as an impurity, said tungsten oxide being recovered in a form substantially free from the said molybdenum impurities comprising:
    (a) digesting the said ore and hydrochloric acid to form tungsten oxide in admixture with the said molybdenum impurities;
    (b) treating the admixture containing the said tungsten oxide and molybdenum impurities with carbon tetrachloride at a temperature of between about 300° C. and 600° C. to form an exit gas stream containing tungsten oxytetrachloride and molybdenum pentachloride;
    (c) hydrolyzing the said tungsten oxytetrachloride in the said exit gas stream with water vapor at a temperature within the range of about 225° C.–275° C. to form tungstic oxide in a solid form and a gas stream containing volatile molybdenum oxide, said hydrolysis being carried out in the presence of hydrogen chloride;
    (d) separating the said gas stream and the solid tungstic oxide;
    (e) passing the said gas stream through a condenser maintained at a temperature below about 150° C. to condense the said molybdenum oxide-hydrogen chloride as a solid;
    (f) and recovering hydrogen chloride from the gaseous materials remaining after removal of the said solid molybdenum oxide-hydrogen chloride compound.

2. The process of claim 1 wherein the ore is scheelite.

3. A process for recovering tungsten oxide from an ore containing tungsten oxide and molybdenum as an impurity, said tungsten oxide being recovered in a form substantially free from the said molybdenum impurities comprising:
    (a) digesting the said ore and hydrochloric acid to form tungsten oxide in admixture with the said molybdenum impurities;
    (b) treating the admixture containing the said tungsten oxide and molybdenum impurities with a mixture of carbon and chlorine at a temperature of between about 600° C. and 1200° C. to form an exit gas stream containing tungsten oxytetrachloride and molybdenum pentachloride;
    (c) hydrolyzing the said tungsten oxytetrachloride in the said exit gas stream with water vapor at a temperature within the range of about 225° C.–275° C. to form tungstic oxide in a solid form and a gas stream containing volatile molybdenum oxide, said hydrolysis being carried out in the presence of hydrogen chloride;
    (d) separating the said gas stream and the solid tungstic oxide;
    (e) passing the said gas stream through a condenser maintained at a temperature below about 150° C. to condense the said molybdenum oxide-hydrogen chloride as a solid;
    (f) and recovering hydrogen chloride from the gaseous materials remaining after removal of the said solid molybdenum oxide-hydrogen chloride compound.

4. The process for recovering tungsten oxide in a finely divided form from an ore containing tungsten oxide and molybdenum as an impurity, said tungsten being recovered in the form of a substantially pure tungsten oxide free from molybdenum impurities, comprising:
    (a) digesting the said ore with hydrochloric acid to dissolve constituents soluble in the said hydrochloric acid and separating the said acid and dissolved materials from the remaining portions of the said ore;
    (b) drying the remaining solid portions to provide a substantially dry solid material containing tungsten oxide and molybdenum as an impurity;
    (c) contacting the said tungsten oxide and molybdenum containing material so formed with a reduction chlorinating agent selected from the class consisting of perchlorethylene, hexachlorethane, phosgene and carbon tetrachloride which is free of hydrogen at a temperature of at least about 227° C. and not in excess of about 1200° C. to form an exit gas stream containing tungsten oxytetrachloride and molybdenum pentachloride;
    (d) hydrolyzing said tungsten oxytetrachloride in the said exit gas stream with water vapor at a temperature within the the range of about 225° C.–275° C. in the presence of hydrogen chloride to form solid finely divided tungstic oxide and an exit gas stream containing a volatile molybdenum oxide-hydrogen chloride compound;
    (e) separating the said solid from the said gas stream;
    (f) passing the said gas stream through a condenser maintained at a temperature below about 150° C. to condense the said molybdenum oxide-hydrogen chloride as a solid;
    (g) and recovering hydrogen chloride from the gaseous materials remaining after removal of the said solid molybdenum oxide-hydrogen chloride compound.

5. A process for recovering tungsten oxide from an ore containing tungsten oxide and molybdenum as an impurity, said tungsten oxide being recovered in a form substantially free from the said molybdenum impurities, comprising:
    (a) contacting the said tungsten oxide and molybdenum containing materials with a reduction chlorinating agent selected from the class consisting of perchlorethylene, hexachlorethane, phosgene, and carbon tetrachloride which is free of hydrogen at a temperature of at least about 227° C. and not in excess of about 1200° C. to form an exit gas stream containing tungsten oxytetrachloride and molybdenum pentachloride;
    (b) hydrolyzing said tungsten oxytetrachloride in the said exit gas stream with water vapor at a temperature within the range of about 225° C.–275° C. in the presence of hydrogen chloride to form solid finely divided tungstic oxide and an exit gas stream containing a volatile molybdenum oxide-hydrogen chloride compound;

(c) separating the said solid from the said gas stream;
(d) passing the said gas stream through a condenser maintained at a temperature below about 150° C. to condense the said molybdenum oxide-hydrogen chloride as a solid;
(e) and recovering hydrogen chloride from the gaseous materials remaining after removal of the said solid molybdenum oxide-hydrogen chloride compound.

References Cited by the Examiner

UNITED STATES PATENTS

| | | | |
|---|---|---|---|
| 926,084 | 6/1909 | Beckwith | 23—21 |
| 1,481,697 | 1/1924 | Dyson et al. | 23—17 |
| 1,911,505 | 5/1933 | Herold et al. | 23—17 |
| 2,801,152 | 7/1957 | Kasey | 23—19 |

FOREIGN PATENTS

| | | |
|---|---|---|
| 134,891 | 11/1919 | Great Britain. |
| 617,896 | 2/1949 | Great Britain. |

OTHER REFERENCES

Mellor: "A Comprehensive Treatise On Inorganic and Theoretical Chemistry," volume 11, Longmans, Green & Co., N.Y., 1931, pages 685 and 687.

BENJAMIN HENKIN, *Primary Examiner.*

MAURICE A. BRINDISI, *Examiner.*

H. T. CARTER, *Assistant Examiner.*